July 20, 1926.
W. C. BUCKBEE ET AL
FLUID TRANSMISSION MECHANISM
Filed July 15, 1924
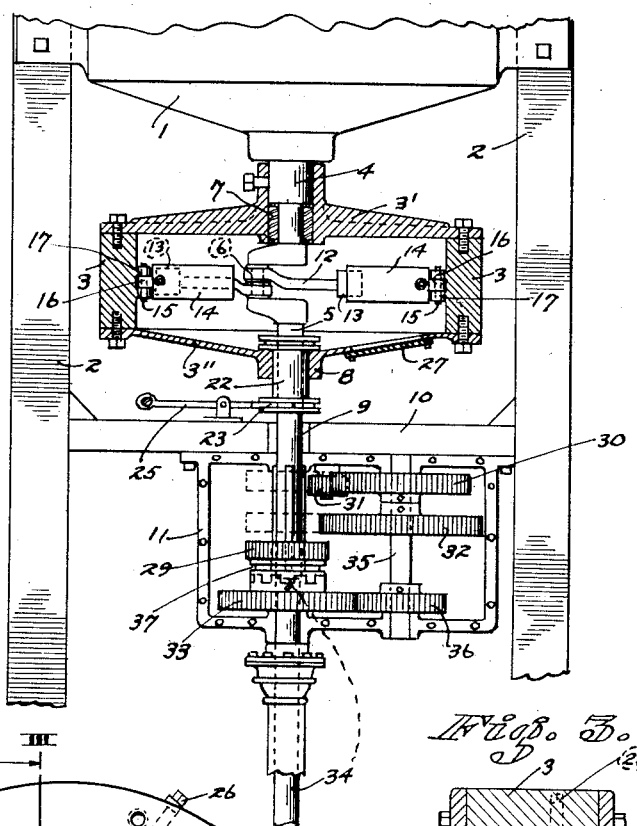
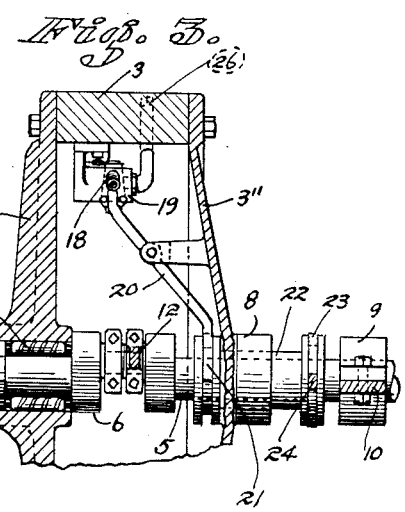
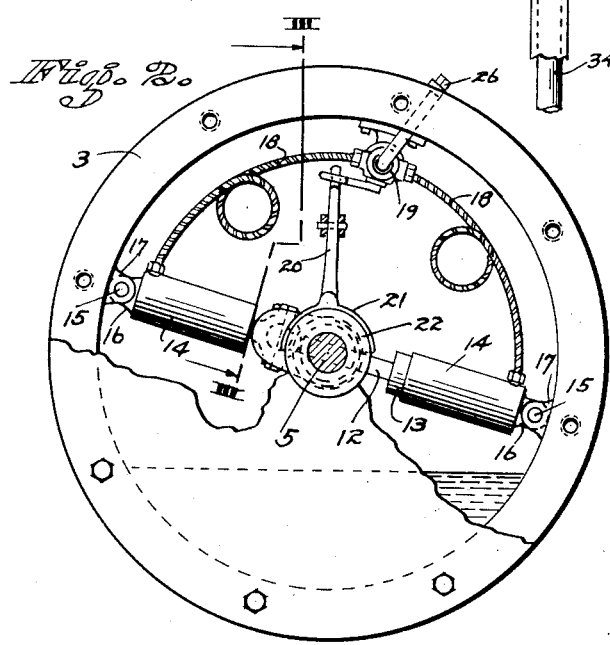
Inventor
WALTER C. BUCKBEE
ARTHUR R. BUCKBEE
Attorneys Patented July 20, 1926.

1,593,059

UNITED STATES PATENT OFFICE.

WALTER C. BUCKBEE AND ARTHUR R. BUCKBEE, OF MANTECA, CALIFORNIA.

FLUID-TRANSMISSION MECHANISM.

Application filed July 15, 1924. Serial No. 726,175.

This invention relates to the control of the transmission of mechanical power from one rotative shaft to another by means of a fluid, particularly a liquid, and has to do principally with the application of such devices to motor vehicles, though it also finds application to other devices in which it is desired to modify, interrupt or gradually apply the flow of power to a machine.

The particular object of our invention is to provide a device of the character mentioned which is simple and effective and entirely contained within the flywheel of an engine, which will be enclosed against dust and injury, which will in the case of an automobile entirely supplant the usual clutch within the flywheel and to a large extent do the work of the transmission gears thereby dispensing with same or at least simplifying them to a simple reverse and extreme low speed gear.

Other advantages will appear as the description proceeds.

In the drawings Figure 1 is a plan view showing part of an automobile chassis frame and the engine flywheel in section with our fluid transmission elements located within the wheel.

Figure 2 is an elevation of the flywheel, on a somewhat larger scale, showing the relation of the cylinders to the by-pass pipe and control valve.

Figure 3 is a view of the control valve from the line III—III of Figure 2.

In further detail the drawings show the rear end of an automobile engine 1 supported by the frame 2 of the chasssis and having a flywheel 3 secured to the projecting end of the engine shaft 4.

The flywheel consists of a heavy rim 3 at the forward side bolted to a flange or disk 3′ secured to the engine shaft, and a lighter flange or disk 3″ bolted to the rearward side of the rim so as to form a housing to enclose the cavity within the flywheel.

Within the flywheel cavity is a short crank shaft 5 having one crank 6 and with its ends aligned with the engine shaft.

The forward end of this crank shaft is supported for rotation in a roller or ball bearing 7 housed within the hub of the flange 3′ and the rear end extends through a hub 8 formed on the rear flange 3″ and is rotatably supported in a bearing 9 carried by a cross piece 10 of the chassis frame and then extends into a gear box 11.

Connected to the crank within the flywheel are two connecting rods 12 each being rigidly connected to a piston 13 operating in a cylinder 14.

The cylinders are each pivoted at their outer ends to the flywheel rim by pins 15 passing through ears 16 on the cylinders and lugs 17 on the inside of the rim, all in such a manner that should the crank shaft be held stationary and the flywheel revolved the pistons would work back and forth within the cylinders while the cylinders oscillated on their pivots.

The pistons have the usual rings to make them fluid tight and the two outer ends of the cylinders are connected by a by-pass 18 so that when a fluid or liquid, say oil, is placed in one of the cylinders it will be alternately pumped from one to the other through the by-pass upon operating the engine and revolving the wheel.

This by-pass takes the form of a flexible metal hose so as to yield to the oscillating movement of the cylinders and midway of its length it is interrupted by a by-pass valve 19 secured to the flywheel rim.

This valve may be of any type most suited for operation by a small movement of a lever, and is for the purpose of controlling the flow of oil from cylinder to cylinder or of stopping it altogether.

The valve is operated by means of a pivoted lever 20 yoked at 21 to a sliding sleeve 22 passing between the hub 8 of the disk 3″ and the crank shaft. At the rear end of the sleeve is another yoke 23 to which attaches an operating lever 24 which is provided with a suitable link or rod 25 as may be necessary on the particular automobile involved to carry it to a foot lever or hand lever on the steering wheel, as may be desired, to operate the sleeve and thereby the valve 19.

The sleeve 22 slides freely as the weight of the rear end of the crank shaft is carried entirely in the bearing 9 on the chassis frame.

In operation of the device the proper amount of oil is introduced into the cylinders through the filling plug 26 which communicates with the interior of the valve, and also a quantity of oil is placed in the flywheel cavity to lubricate the connecting rod bearings and pivots 15 and bearings 7.

An inspection cover 27 on the rear disk 3'' makes it easy to introduce the oil and also to examine the mechanism within the flywheel if desired.

In operation of the device, assuming the sleeve 22 to be moved by the driver of the automobile to open fully the valve 19, upon starting the engine the flywheel will simply pump the oil back and forth from cylinder to cylinder without revolving the crank shaft, but as the valve is gradually closed by the driver the cylinders will gradually become locked, as it were, with the crank shaft so that all will revolve together, and if the crank shaft is engaged with the propeller shaft of the automobile the vehicle will be under motion.

It will be seen that the degree of opening of the valve determines the speed of the vehicle, but to make it practicable a reverse gear is necessary; also for very hard climbing a positive low speed forward gear is desirable, and to this end the crank shaft 5 extends into a gear box 28 and carries a splined pinion 29 adapted to engage selectively a reverse gear 30 through means of an idler pinion 31, or a slow speed gear 32, or free itself from both gears and engage the jaw clutch on the driven gear 33 secured to the end of the universal or propeller shaft 34.

The gears 30 and 32 are carried on a countershaft 35 which also carries a pinion 36 which meshes with the gear 33, and the splined pinion may be moved in the usual manner by a hand lever from the yoke 37.

The exact type of gear shift used to complete our invention is of no great importance except that it should embody a reverse gear and desirably also a slow speed forward gear, though all other speeds, also neutrality, are secured through manipulation of the control by-pass valve 19 and which through its unlimited speed control variation makes it seldom necessary to revert to the use of the positive low gear 32, and in braking the vehicle through engine compression with ignition turned off the control is ideal.

While we have confined ourselves to the showing of our invention in connection with an automobile, it is evident that it will also find use in other gas engine service such as motor boats, hoists, and other devices having two aligned shafts between which a smooth control of power is wanted and which it is desired should be embodied in a most compact assemblage. Also, in contemplating our invention above set forth, it will be evident to any mechanic without further illustration that instead of two cylinders as shown any number may be used pumping from one to the other, and any such modifications falling within the spirit of the invention are intended to be covered by our appended claims.

We claim:

1. A fluid transmission of the character described comprising a flywheel secured to a power shaft, a crank shaft free and rotatably mounted axially of the wheel with its crank embraced within the confines of the flywheel rim, a pair of cylinders pivotally mounted at opposite diametral points on the inside periphery of the rim, a piston in each cylinder with a connecting rod engaging the crank whereby upon relative rotation of the wheel and crank shaft the pistons are reciprocated within the cylinders, a flexible pipe extending from each cylinder connected by a valve for controlling the passage of fluid between the cylinders, and means at a fixed point without the wheel adapted for opening and closing the valve.

2. In a transmission of the character described, a rotatable flywheel with an inter-rim cavity enclosed by two disks, a crank shaft with its crank within the cavity and ends axially aligned with the axis of rotation of the wheel, one end of said shaft being supported on a bearing carried by one of the disks and the other end extending through the opposite disk, a slidable sleeve around the extended end between the shaft and disk through which it extends, a fluid transmission within the cavity adapted for delivering power from the flywheel rim to the crank for turning the crank shaft, and a controlling valve for the transmission fluid disposed within the cavity and connected for operation from without to the said slidable sleeve, said controlling valve being secured to the flywheel rim and having a passage to the outside of the rim adapted for injection of fluid through the valve to the transmission.

3. A fluid transmission of the character described comprising a flywheel secured to a power shaft, a crank shaft free and rotatably mounted axially of the wheel with its crank embraced within the confines of the flywheel rim, a pair of cylinders pivotally mounted on the inside periphery of the rim, a piston in each cylinder with a connecting rod engaging the crank whereby upon relative rotation of the wheel and crank shaft the pistons are reciprocated within the cylinders, a flexible pipe extending from each cylinder connected by a valve for controlling the passage of fluid between the cylinders, and means at a fixed point without the wheel adapted for opening and closing the valve.

4. In a transmission of the character described, a flywheel with an inter-rim cavity enclosed by two disks, a crank shaft with its crank within the cavity, one end of said shaft being supported on a bearing carried by one of the disks and the other end extending through the opposite disk, a slidable sleeve around the extended end between the shaft and disk through which it extends, a fluid transmission within the cavity adapted for delivering power from the flywheel rim to the crank for turning the crank shaft, and a controlling valve for the transmission fluid disposed within the cavity and connected for operation from without to the said slidable sleeve, said controlling valve being secured to the flywheel rim and having a passage to the outside of the rim adapted for injection of fluid through the valve to the transmission.

WALTER C. BUCKBEE.
ARTHUR R. BUCKBEE.